(12) United States Patent
Yoon et al.

(10) Patent No.: US 10,615,621 B2
(45) Date of Patent: Apr. 7, 2020

(54) APPARATUS FOR CHARGING AND DISCHARGING BATTERY CELL COMPRISING INSULATION MASK

(71) Applicant: LG Chem, Ltd., Seoul (KR)

(72) Inventors: Sung Pil Yoon, Daejeon (KR); Jin Soo Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 113 days.

(21) Appl. No.: 15/921,904

(22) Filed: Mar. 15, 2018

(65) Prior Publication Data
US 2018/0269699 A1 Sep. 20, 2018

(30) Foreign Application Priority Data
Mar. 15, 2017 (KR) .......................... 10-2017-0032174

(51) Int. Cl.
*H01M 10/46* (2006.01)
*H02J 7/00* (2006.01)
*H01M 10/44* (2006.01)

(52) U.S. Cl.
CPC ........... *H02J 7/0045* (2013.01); *H01M 10/44* (2013.01); *H01M 10/46* (2013.01)

(58) Field of Classification Search
CPC .............................. H01M 10/46; H01M 10/44
See application file for complete search history.

(56) References Cited

U.S. PATENT DOCUMENTS

2014/0287279 A1* 9/2014 Kim .................... H01M 2/0285
429/7

FOREIGN PATENT DOCUMENTS

| JP | 2006-331668 A | 12/2006 |
|----|---------------|---------|
| KR | 10-0782886 B1 | 12/2007 |
| KR | 20-0462789 Y1 | 10/2012 |

* cited by examiner

*Primary Examiner* — Olatunji A Godo
(74) *Attorney, Agent, or Firm* — Birch, Stewart, Kolasch & Birch, LLP

(57) ABSTRACT

The present disclosure provides a battery cell charging and discharging apparatus configured to charge and discharge a battery cell which is sealed in a state in which an electrode assembly is embedded in a battery case and includes a first die plate having a first charging pin which is connected to a first electrode terminal of the battery cell by being contacted thereto during a charging and discharging process of the battery cell. The first die plate includes an insulation mask of an electrical insulation material formed in a structure covering a remaining part of the battery cell excluding the first electrode terminal at a position corresponding to the first charging pin and mask fixing portions configured to fix both sides of the insulation mask so that a position of the insulation mask is set.

15 Claims, 3 Drawing Sheets

APPARATUS FOR CHARGING AND DISCHARGING BATTERY CELL COMPRISING INSULATION MASK

CROSS-REFERENCE TO RELATED APPLICATION

This application claims priority to Korean Patent Application No. 10-2017-0032174 filed on Mar. 15, 2017 and all the benefits accruing therefrom under 35 U.S.C. § 119, the contents of which are incorporated by reference in their entirety.

TECHNICAL FIELD

The present disclosure relates to an apparatus for charging and discharging a battery cell including an insulation mask.

RELATED ART

Depletion of fossil fuel has brought about a great increase in the price of energy sources and increased interest in environmental pollution. Eco-friendly alternative energy sources are a necessity for the next generation. In this regard, a great deal of research into power production methods such as nuclear energy, solar power, wind power, and tidal power is underway, and a power storage device for efficiently utilizing the produced energy is also attracting much attention.

In terms of the shape of batteries, the demand for prismatic secondary batteries or pouch-shaped secondary batteries which are thin enough to be applied to products such as mobile phones is very high. In terms of the material for batteries, the demand for lithium secondary batteries, such as lithium ion batteries and lithium ion polymer batteries, exhibiting high energy density, discharge voltage, and output stability is very high.

In addition, secondary batteries may be classified based on the structure of an electrode assembly in which a positive electrode, a negative electrode, and a separator interposed between the positive electrode and the negative electrode are stacked. For example, the electrode assembly may have a jelly-roll (wound) type structure in which long-sheet type positive electrodes and negative electrodes are wound while separators are disposed between the positive electrodes and the negative electrodes or have a stacked type structure in which pluralities of positive electrodes and negative electrodes, each having a predetermined size, are sequentially stacked while separators are disposed between the positive electrodes and the negative electrodes. Recently, in order to solve the problems of the jelly-roll type and the stacked type electrode assemblies, a stacked/folded type structure in which pluralities of positive electrodes and negative electrodes each having a predetermined size are sequentially stacked while separators are disposed between the positive electrodes and the negative electrodes to constitute a unit cell, such as a bi-cell or a full cell, and then the unit cells are wound while being disposed on a separation film was developed as an advanced electrode assembly by combining the jelly-roll type and the stacked type.

Meanwhile, secondary batteries may be classified based on the shape of a battery case into a cylindrical battery having a structure in which an electrode assembly is mounted in a cylindrical metal container, a prismatic battery having a structure in which an electrode assembly is mounted in a prismatic metal container, and a pouch-shaped battery having a structure in which an electrode assembly is mounted in a pouch-shaped case made of a laminated aluminum sheet.

FIG. 1 is a schematic view showing a structure of a conventional prismatic type battery cell. Referring to FIG. 1, a prismatic type battery cell 100 has a structure in which an electrode assembly (not shown) having a structure in which a separator is interposed between a positive electrode and a negative electrode is embedded in a prismatic type battery case 100. The battery case 110 includes a rectangular case body 111 having an open upper end on which a cap plate 112 provided with a protruding negative electrode terminal 120 is mounted, and the case body 111 and cap plate 112 are made of an electrically conductive material, more specifically, a metallic material. The negative electrode terminal 120 is electrically connected to a negative electrode of the electrode assembly and a remaining part of the battery case 110 excluding the negative electrode terminal 120 is electrically connected to a positive electrode of the electrode assembly to form a positive electrode terminal 130 by itself. The prismatic type battery cell is manufactured as a final battery cell through an activation process in which a battery cell is repeatedly charged and discharged in a state in which an electrode assembly is embedded in a battery case with an electrolyte.

FIG. 2 is a schematic view showing a structure of a conventional battery cell charging and discharging apparatus configured to charge and discharge the prismatic type battery cell of FIG. 1. Referring to FIG. 2, a battery cell charging and discharging apparatus 200 includes a first die plate 210 and a second die plate 220. The first die plate 210 is positioned above the prismatic type battery cell 100 corresponding to the negative electrode terminal 120 of the prismatic type battery cell 100, and includes a first charging pin 230 that protrudes downward in a direction of the prismatic type battery cell 100 and is electrically connected to the negative electrode terminal 120 of the prismatic type battery cell 100 by being contacted thereto. The second die plate 220 is positioned below the prismatic type battery cell 100, and includes a second charging pin 240 that protrudes upward in a direction of the prismatic type battery cell 100 and is electrically connected to the positive electrode terminal 130, which is formed on a lower surface of the battery case 110 of the prismatic type battery cell 100 by being contacted thereto.

During a charging and discharging process of the prismatic type battery cell 100, the first die plate 210 and the second die plate 220 vertically move toward the prismatic type battery cell 100. Accordingly, the first charging pin 230 and the second charging pin 240 which are respectively formed on the first die plate 210 and the second die plate 220 are brought into contact with and electrically connected to the negative electrode terminal 120 and the positive electrode terminal 130 of the prismatic type battery cell 100, respectively.

However, since the negative electrode terminal 120 of the prismatic type battery cell 100 has a smaller area than that of the positive electrode terminal 130 formed in the remaining part of the battery case 110 excluding the negative electrode terminal 120, the first charging pin 230 which is brought into contact with the negative electrode terminal 120 of the prismatic type battery cell 100 may frequently leave the negative electrode terminal 120 region and may contact the positive electrode terminal 130 formed in the battery case 110 even when the prismatic type battery cell 100 moves slightly. Such contact failures may cause a short circuit inside the prismatic type battery cell 100 and may further cause ignition or explosion of the battery cell 100, and accordingly, the safety of workers may be compromised during charging and discharging the prismatic type battery cell 100.

To solve such problems, it is possible to consider a solution in which a short circuit or safety concern due to the contact of the first charging pin 230 is prevented by attaching an insulation paper to the remaining part excluding the negative electrode terminal 120 of an upper surface of the prismatic type battery cell 100, on which the negative electrode terminal 120 is formed. However, the insulation paper must be manually attached to or replaced from every battery cell 100 by workers, which causes increased manpower, time, and cost, thereby increasing the manufacturing costs of the prismatic type battery cell 100. Therefore, there is a great need for a technology that can fundamentally solve such problems.

SUMMARY

The present disclosure is provided to solve the above-described problems of the related art and technical problems which have been identified in the past.

In particular, since a first die plate of a battery cell charging and discharging apparatus may include an insulation mask of an electrical insulation material formed in a structure covering a remaining part of a battery cell excluding a first electrode terminal and mask fixing portions configured to fix the insulation mask. During a charging and discharging process of the battery cell, the insulation mask may be brought into close contact with a surface of the battery cell from which a first electrode terminal protrudes while the first die plate moves so that the first charging pin is connected to the first electrode terminal of the battery cell, and thus the remaining part of the battery cell excluding the first electrode terminal is covered by the insulation mask, thereby preventing the first charging pin from being in direct contact with a second electrode terminal formed in the remaining part of the battery cell excluding the first electrode terminal. Accordingly, problems such as a short circuit inside the battery cell, or ignition or explosion of the battery cell due to a contact failure of the first charging pin may be prevented, and the insulation mask or a separate insulation paper does not need to be individually attached to or replaced from each of the battery cells that performs charging and discharging so that manpower, time, and costs required for the attachment or replacement work may be saved. As a result, the manufacturing costs of the battery cell may be saved.

In order to accomplish the above object, a battery cell charging and discharging apparatus according to the present disclosure is an apparatus configured to charge and discharge a battery cell which is sealed in a state in which an electrode assembly is embedded in a battery case and may include a first die plate having a first charging pin which is configured to be connected to a first electrode terminal of the battery cell by being in contact therewith during a charging and discharging process of the battery cell. The first die plate may also include an insulation mask of an electrically insulating material formed in a structure covering a remaining part of the battery cell excluding the first electrode terminal at a position corresponding to the first charging pin and mask fixing portions configured to fix both sides of the insulation mask so that a position of the insulation mask is set.

The battery cell in this apparatus may have an electrode assembly including a positive electrode, a negative electrode, and a separator interposed between the positive electrode and the negative electrode, a battery case of an electrically conductive material sealed in a state in which the electrode assembly is embedded in the battery case, a first electrode terminal protruding from one end of the battery case, and a second electrode terminal formed on a remaining portion of the battery case excluding the first electrode terminal. Here, the first electrode terminal and the second electrode terminal may be the negative electrode and the positive electrode, respectively.

In addition, the insulation mask may have a through hole perforated at a position corresponding to the first electrode terminal of the battery cell, and have a plate-type structure in which a remaining portion excluding the through hole covers the remaining part of a surface of the battery cell from which the first electrode terminal protrudes. The insulation mask may further have a structure in which at least both sides thereof are fixed by the mask fixing portions so that the through hole is disposed between the first electrode terminal of the battery cell and the first charging pin of the first die plate. The mask fixing portions may comprise a pair of clips or a pair of vacuum suction cups. The mask fixing portions may be mounted on the first die plate in a structure capable of moving in both directions with the first charging pin as a center so that positions of the fixing portions may be adjusted based on a size of the insulation mask or battery cell.

During the charging and discharging process, the first die plate may be configured to be disposed toward the first electrode terminal of the battery cell, and the first charging pin and insulation mask of the first die plate may be simultaneously disposed affixed to the first die plate toward the first electrode terminal of the battery cell.

The thickness of the insulation mask may be in a range of 10% to 90% of a protruding height of the first electrode terminal of the battery cell, and the insulation mask may be configured to abut the surface of the battery cell from which the first electrode terminal protrudes when the first die plate is disposed, and the first electrode terminal of the battery cell protrudes through the through hole of the insulation mask and is connected to the first charging pin of the first die plate. Here, the insulation mask may be made of a polymeric resin.

In addition, the battery cell charging and discharging apparatus may further include a second die plate on which a second charging pin configured to be electrically connected to the second electrode terminal of the battery cell by being contacted thereto is formed. The second charging pin may be electrically connected to a portion of the battery case opposite to the first electrode terminal by being contacted thereto. Also, the second die plate may be configured to be disposed toward the second electrode terminal of the battery cell.

Accordingly, during the charging and discharging process of the battery cell, the first die plate may be disposed so that the first charging pin is connected to the first electrode terminal of the battery cell, and simultaneously, the insulation mask fixed by the mask fixing portions may be disposed so that the insulation mask is brought into close contact with a surface of the battery cell from which the first electrode terminal protrudes, and accordingly, the remaining part of the battery cell excluding the first electrode terminal may be covered by the insulation mask, thereby preventing the first charging pin from being in direct contact with a second electrode terminal formed in the remaining part of the battery cell excluding the first electrode terminal. Therefore, problems such as a short circuit inside the battery cell, or ignition or explosion of the battery cell due to a contact failure of the first charging pin may be prevented, and the insulation mask or a separate insulation paper does not need to be individually attached to or replaced from each of the battery cells that performs charging and discharging so that manpower, time, and costs required for the attachment or replacement work may be saved, and as a result, the manufacturing costs of the battery cell may be saved.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
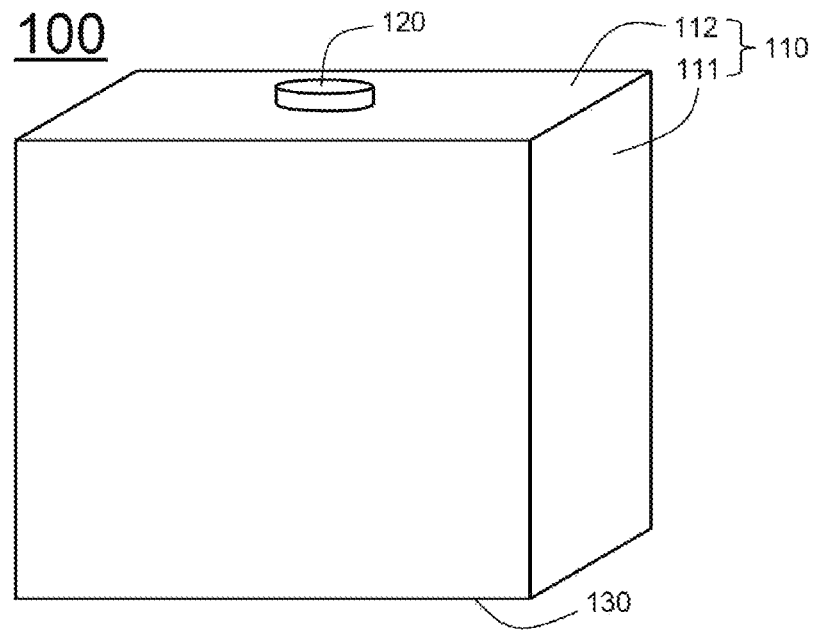
FIG. 1 is a schematic view showing a structure of a conventional prismatic type battery cell.
Figure 2:
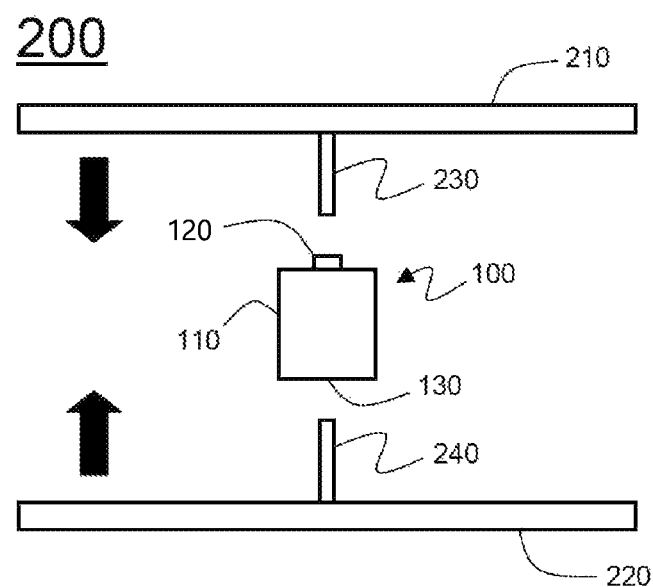
FIG. 2 is a schematic view showing a structure of a conventional battery cell charging and discharging apparatus configured to charge and discharge the prismatic type battery cell of FIG. 1.

Advantages and features of the present disclosure and methods of achieving the same will become apparent with reference to the exemplary embodiments described in detail below in conjunction with the accompanying drawings. However, the present disclosure is not limited to the exemplary embodiments disclosed below, but may be provided in various different forms. The present exemplary embodiments are merely provided to make the disclosure complete and to fully inform the category of the disclosure to a person having ordinary knowledge in the technical field to which the present disclosure pertains, and the present disclosure is only defined by the scope of the claims.

Accordingly, in some embodiments, well-known process steps, well-known structures and well-known techniques will not be specifically described in order to avoid ambiguous interpretation of the present disclosure. The terms used in the present specification are for the purpose of illustrating the examples and do not limit the present disclosure. As used herein, the singular form also includes the plural forms unless specifically stated in a phrase. The terms "comprises" and/or "comprising" used in the specification are used in the meaning of not excluding the presence or addition of one or more other constituent elements, steps, operations and/or elements, in addition to the referenced constituent elements, step, operation and/or element. Further, the term "and/or" includes each and one or more combinations of the referenced items.

The exemplary embodiments described herein will be also described with reference to cross-sectional and/or schematic views, which are ideal exemplary views of the present disclosure. Therefore, the forms of the exemplary views may be modified by manufacturing technique and/or tolerance and the like. Therefore, the exemplary embodiments of the present disclosure also include a change in the form generated according to the manufacturing process, without being limited to the illustrated specific form. Further, in each drawing illustrated in the present disclosure, the respective constituent elements may be illustrated by being slightly enlarged or reduced for the convenience of explanation. The same reference numerals refer to the same elements throughout the specification.

A battery cell charging and discharging apparatus according to the present disclosure is an apparatus configured to charge and discharge a battery cell which is sealed in a state in which an electrode assembly is embedded in a battery case and may include a first die plate having a first charging pin which is connected to a first electrode terminal of the battery cell by being contacted thereto during a charging and discharging process of the battery cell. Here, the first die plate may include an insulation mask of an electrically insulating material formed in a structure covering a remaining part of the battery cell excluding the first electrode terminal at a position corresponding to the first charging pin and mask fixing portions configured to fix both sides of the insulation mask so that a position of the insulation mask is set.

During the charging and discharging process of the battery cell, the first die plate may move so that the first charging pin is connected to the first electrode terminal of the battery cell, and simultaneously, the insulation mask fixed by the mask fixing portions may move so that the insulation mask is brought into close contact with a surface of the battery cell from which the first electrode terminal protrudes. Accordingly, the remaining part of the battery cell excluding the first electrode terminal may be covered by the insulation mask, thereby preventing the first charging pin from being in direct contact with a second electrode terminal formed in the remaining part of the battery cell excluding the first electrode terminal. Therefore, problems such as a short circuit inside the battery cell, or ignition or explosion of the battery cell due to a contact failure of the first charging pin may be prevented, and the insulation mask or a separate insulation paper does not need to be individually attached to or replaced from each of the battery cells that performs charging and discharging so that manpower, time, and costs required for the attachment or replacement work may be saved, and as a result, the manufacturing costs of the battery cell may be saved.

In one specific example, the battery cell may include an electrode assembly including a positive electrode, a negative electrode, and a separator interposed between the positive electrode and the negative electrode, a battery case of an electrically conductive material sealed in a state in which the electrode assembly is embedded in the battery case, a first electrode terminal protruding from one end of the battery case, and a second electrode terminal formed on at least one remaining portion of the battery case excluding the first electrode terminal.

That is, the battery cell charging and discharging apparatus according to the present disclosure may exhibit the maximized effect when charging and discharging a battery cell having a structure in which a second electrode terminal is formed in a remaining part of a battery case excluding a first electrode terminal due to the battery case made of an electrically conductive material, more specifically, when charging and discharging a cylinder type battery cell or prismatic type battery cell.

Here, the first electrode terminal and the second electrode terminal may be a negative electrode and a positive electrode, respectively. In other words, the battery cell charging and discharging apparatus according to the present disclosure may effectively prevent problems in which the first electrode terminal and the second electrode terminal have polarities different from each other, and accordingly, during the charging and discharging process of the battery cell, the first charging pin to be electrically connected to the first electrode terminal may be brought into direct contact with the second electrode terminal having a polarity different from that of the first electrode terminal, so that a short circuit may occur in the battery cell, and safety due to ignition, explosion, or the like may be compromised.

Further, the insulation mask may include a through hole at a position corresponding to the first electrode terminal of the battery cell, and may have a plate-type structure in which a remaining portion excluding the through hole of the insulation mask may cover the remaining part of a surface of the battery cell, from which the first electrode terminal protrudes.

Accordingly, the first electrode terminal may abut the first charging pin of the first die plate through the through hole perforated in the insulation mask, and the remaining part of the surface of the battery cell, from which the first electrode terminal protrudes may be covered by the insulation mask having a plate-type structure, and thus direct contact with the first charging pin may be prevented.

Further, the insulation mask may have a structure in which both sides thereof are fixed by the mask fixing portions so that the through hole is positioned between the first electrode terminal of the battery cell and the first charging pin of the first die plate.

Accordingly, the insulation mask may be prevented from moving due to contact with the battery cell even when the first die plate moves to and abuts the surface of the battery cell on which the first electrode terminal is formed, and thus the insulation mask may maintain a stable close contact state with the surface of the battery cell on which the first electrode terminal is formed.

In one specific example, the mask fixing portions may include a pair of clips configured to fix the both sides of the insulation mask by clamping. That is, the mask fixing portions may fix both opposite sides of the insulation mask in a clamping manner using the pair of clips, so that the insulation mask may be more stably fixed.

In another specific example, the mask fixing portions may include a pair of vacuum suctions (e.g., vacuum suction cups or vacuum plungers) configured to fix the both sides of the insulation mask in a manner that uses vacuum.

The mask fixing portions may be configured such that the pair of vacuum suction cups fix the both opposite sides of the insulation mask, and thus physical stimulation or external force applied to the both sides of the insulation mask may be minimized compared to the method of fixing the insulation mask by clamping so that damages to the insulation mask may be prevented.

Here, the mask fixing portions may be mounted on the first die plate in a structure capable of moving in both opposite side directions with the first charging pin as a center so that positions of the fixing portions may be adjusted based on the size of an insulation mask or battery cell.

Accordingly, the mask fixing portions may be applied to most battery cells regardless of the size of an insulation mask or battery cell, and thus, it is not necessary to manufacture a separate battery cell charging and discharging apparatus for various sizes of the insulation mask or battery cell, or to replace the mask fixing portions with separate mask fixing portions, thereby saving the costs required for the manufacturing or replacement work.

The first die plate may have a structure in which the first die plate moves toward the first electrode terminal of the battery cell during the charging and discharging process, and the first charging pin and insulation mask of the first die plate simultaneously move toward the first electrode terminal of the battery cell while being fixed to the first die plate.

Accordingly, since the first charging pin and the insulation mask may move toward the first electrode terminal of the battery cell simultaneously with the movement of the first die plate, there is no need for a separate unnecessary distance adjustment process, and thus the battery cell charging and discharging apparatus may be designed and configured with a simpler structure.

In one specific example, a thickness of the insulation mask may be in a range of 10% to 90% of a protruding height of the first electrode terminal of the battery cell.

In addition, in the charging and discharging process, the insulation mask may be brought into close contact with the surface of the battery cell from which the first electrode terminal protrudes while the first die plate moves, and the first electrode terminal of the battery cell may protrude through the through hole of the insulation mask and may be connected to the first charging pin of the first die plate.

Accordingly, when the insulation mask abuts the surface of the battery cell from which the first electrode terminal protrudes, the first electrode terminal may protrude through the through hole which is perforated in the insulation mask, and as a result, only the protruding first electrode terminal discriminatingly contacts the first charging pin, thereby effectively preventing the first charging pin from contacting the remaining part of the battery cell excluding the first electrode terminal.

Although the insulation mask may be made of an electrically insulating polymeric resin, the material of the insulation mask is not limited thereto. The type of material of the insulation mask is not limited as long as the material of the insulation mask is a material capable of providing stable electrical insulation between the first charging pin and the first electrode terminal of the battery cell.

In one specific example, the battery cell charging and discharging apparatus may have a structure that further includes a second die plate on which a second charging pin which is electrically connected to the second electrode terminal of the battery cell by being contacted thereto is formed. Here, the second charging pin may be electrically connected to a portion of the battery case opposite to the first electrode terminal by being contacted thereto.

As described above, the battery cell charging and discharging apparatus according to the present disclosure may present a maximized effect when charging and discharging a battery cell having a structure in which a second electrode terminal is formed on at least one portion of the remaining portions of the battery case excluding the first electrode terminal.

Here, the battery cell charging and discharging apparatus may have a structure in which the second charging pin, which is configured to contact the second electrode terminal having a polarity different from that of the first electrode terminal of the battery cell, is brought into contact with the portion of the battery case opposite to the first electrode terminal, and thus the contact between the first charging pin and the first electrode terminal may be prevented or minimized.

Further, the second die plate may have a structure that moves toward the second electrode terminal of the battery cell during the charging and discharging process of the battery cell. Accordingly, the first charging pin and the second charging pin may contact the first electrode terminal and the second electrode terminal of the battery cell, respectively, by properly moving the first die plate and the second die plate even when a position at which the battery cell is fixed and a size of the battery cell to be charged and discharged are changed.

As described above, since the first die plate of the battery cell charging and discharging apparatus according to the present disclosure may include an insulation mask of an electrically insulating material formed in a structure covering a remaining part of a battery cell excluding a first electrode terminal and mask fixing portions configured to fix the insulation mask, during a charging and discharging process of the battery cell. The insulation mask may be brought into close contact with a surface of the battery cell from which a first electrode terminal protrudes while the first die plate is disposed so that the first charging pin is connected to the first electrode terminal of the battery cell, and simultaneously, the insulation mask fixed by the mask fixing portions is also disposed, and thus the remaining part of the battery cell excluding the first electrode terminal is covered by the insulation mask, thereby preventing the first charging pin from directly contacting a second electrode terminal formed in the remaining part of the battery cell excluding the first electrode terminal. Accordingly, problems such as a short circuit inside the battery cell, or ignition or explosion of the battery cell due to a contact failure of the first charging pin may be prevented, and the insulation mask or a separate insulation paper does not need to be separately attached to or replaced from each of the battery cells that performs charging and discharging so that manpower, time, and costs required for the attachment or replacement work may be saved, and as a result, the manufacturing costs of the battery cell may be saved.

Hereinafter, exemplary embodiments of the present disclosure will be described in detail with reference to the drawings, and the scope of the present disclosure is not limited thereto.

Figure 3:
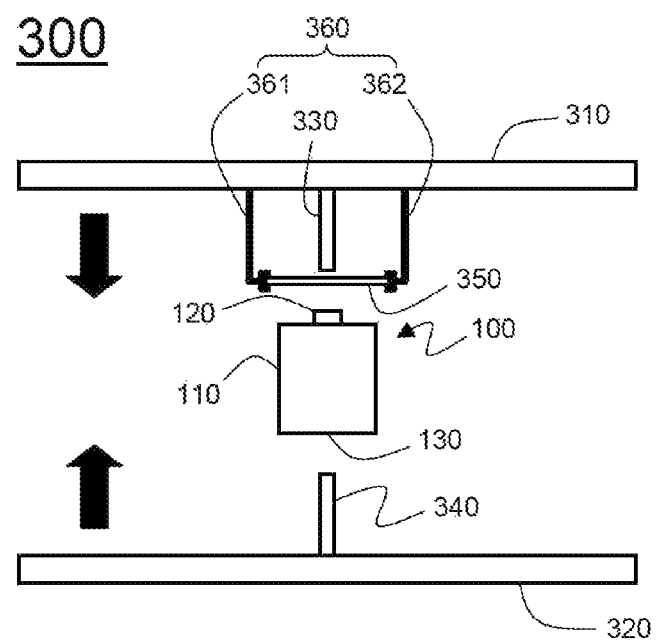
FIG. 3 is a schematic view showing a structure of a battery cell charging and discharging apparatus according to one exemplary embodiment of the present disclosure.

FIG. 3 is a schematic view showing a structure of a battery cell charging and discharging apparatus according to one exemplary embodiment of the present disclosure. Referring to FIG. 3, a battery cell charging and discharging apparatus 300 may include a first die plate 310 and a second die plate 320. The first die plate 310 may be positioned above a battery cell 100 corresponding to a negative electrode terminal 120 of the battery cell 100, and may include a first charging pin 330 that protrudes downward in a direction of the battery cell 100 and is electrically connected to the negative electrode terminal 120 of the battery cell 100 by being contacted thereto.

The second die plate 220 may be positioned below the battery cell 100, and may include a second charging pin 340 that protrudes upward in a direction of the battery cell 100 and is electrically connected to a positive electrode terminal 130, which is formed on a lower surface of a battery case 110 of the battery cell 100 by being contacted thereto.

During a charging and discharging process of the battery cell 100, the first die plate 310 and the second die plate 320 may vertically move toward the battery cell 100. Accordingly, the first charging pin 330 and the second charging pin 340 which are respectively formed on the first die plate 310 and the second die plate 320 may be brought into contact with and electrically connected to the negative electrode terminal 120 and the positive electrode terminal 130 of the battery cell 100, respectively.

Mask fixing portions 360 including a pair of clips 361 and 362 configured to fix both sides of an insulation mask 350 on both sides opposite to each other with a first charging pin 330 as a center may be disposed on a lower surface of the first die plate 310.

The insulation mask 350 may be located at a lower end adjacent to the first charging pin 330 and both sides of the insulation mask 350 may be fixed by the mask fixing portions 360 in a clamping manner. Accordingly, during the charging and discharging process of the battery cell 100, when the first die plate 310 moves downward toward the battery cell 100, the insulation mask 350 may move downward toward the battery cell 100 together with the first die plate 310 affixed to the lower end of the first charging pin 330, and may abut an upper surface of the battery cell 100 having the negative electrode terminal 120. Thus, problems such as direct contact between the upper surface of the battery cell 100 excluding the negative electrode terminal 120 and the first charging pin 330, and a short circuit inside the battery cell 100, or ignition or explosion of the battery cell 100 due to the direct contact may be prevented. Further, a separate insulation paper does not need to be individually attached to or replaced from the upper surface of each of the battery cells 100 that performs charging and discharging, and thus manpower, time, and costs required for the attachment or replacement work may be saved.

Figure 4:
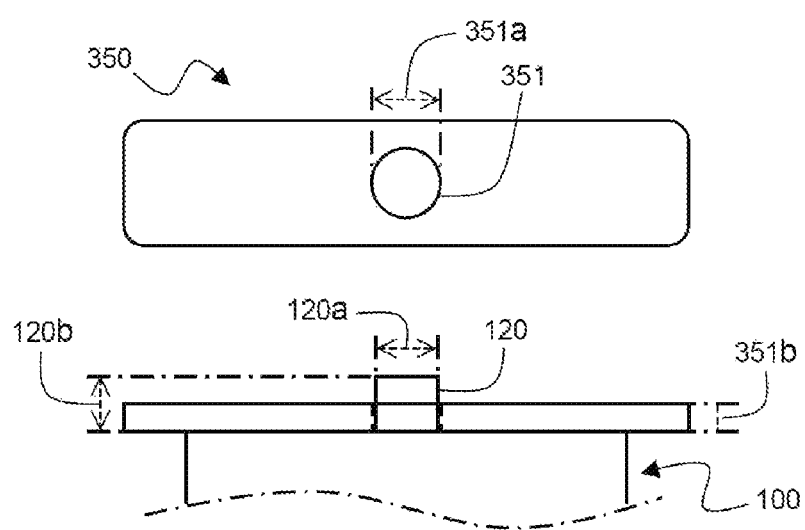
FIG. 4 is a schematic view showing a structure of an insulation mask fixed to mask fixing portions of FIG. 3.

FIG. 4 is a schematic view showing a structure of the insulation mask fixed to the mask fixing portions of FIG. 3. Referring to FIG. 4, the insulation mask 350 may have a plate-type structure covering the upper surface of the battery cell 100 from which the negative electrode terminal 120 protrudes, and has a portion corresponding to the negative electrode terminal 120, at which a through hole 351 is perforated. A width 351a of the through hole 351 may have a size corresponding to a width 120a of the negative electrode terminal 120, and a thickness 351b of the insulation mask 350 may have a size of about 50% with respect to a height 120b of the negative electrode terminal 120.

Accordingly, when the insulation mask 350 is brought into close contact with the upper surface of the battery cell 100, the negative electrode terminal 120 may be exposed due to the structure from which the negative electrode terminal 120 protrudes to the upper portion of the insulation mask 350 through the through hole 351. By covering the remaining part excluding the negative electrode terminal 120 of the upper surface of the battery cell 100 with the insulation mask 350, it is possible to prevent problems that may be caused by the first charging pin directly contacting the upper surface of the battery cell 100 other than the negative electrode terminal 120.

Figure 5:
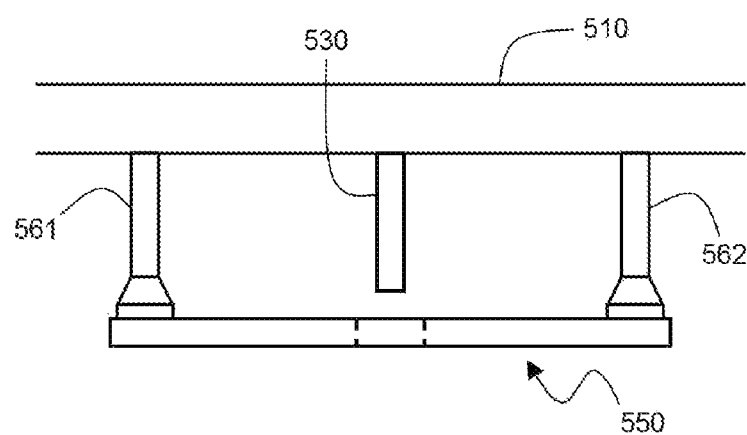
FIG. 5 is a schematic view showing a structure of mask fixing portions of a battery cell charging and discharging apparatus according to another exemplary embodiment of the present disclosure.

FIG. 5 is a schematic view showing a structure of mask fixing portions of a battery cell charging and discharging apparatus according to another exemplary embodiment of the present disclosure. Referring to FIG. 5, the mask fixing portions including a pair of vacuum suctions 561 and 562 may be formed on both sides with a first charging pin 530 of a first die plate 510 at a center. Each of the vacuum suctions 561 and 562 may fix each of both sides of an upper surface of an insulation mask 550 by vacuum suction.

Accordingly, physical pressure applied to the insulation mask 550 due to the direct contact with the insulation mask 550 may be minimized and thus damage to the insulation mask 550 may be minimized in comparison to the method of fixing both sides of the insulation mask 550 using a pair of clips, thereby more effectively saving the costs of replacing the insulation mask 550.

Although the present disclosure has been described with reference to the accompanying drawings and exemplary embodiments thereof, it should be understood by those skilled in the art that various changes may be made without departing from the spirit and scope of the present disclosure.

The invention claimed is:

1. A battery cell charging and discharging apparatus configured to charge and discharge a battery cell which is sealed in a state in which an electrode assembly is embedded in a battery case, comprising:
 a first die plate having a first charging pin that protrudes from the first die plate and is configured to be connected to a first electrode terminal of the battery cell by being in contact therewith during a charging and discharging process of the battery cell;
 mask fixing portions that extend from the first die plate, wherein the mask fixing portions include a first end and a second end, and the first end of the mask fixing portions is mounted on the first die plate; and
 an insulation mask of an electrically insulating material formed in a structure covering a remaining part of the battery cell excluding the first electrode terminal at a position corresponding to the first charging pin, wherein the insulation mask is coupled to the second end of the mask fixing portions.

2. The apparatus of claim 1, wherein the battery cell comprises:
 an electrode assembly including a positive electrode, a negative electrode, and a separator interposed between the positive electrode and the negative electrode;
 the battery case of an electrically conductive material sealed in a state in which the electrode assembly is embedded in the battery case;
 the first electrode terminal protruding from one end of the battery case; and
 a second electrode terminal formed on a remaining portion of the battery case excluding the first electrode terminal.

3. The apparatus of claim 2, wherein the first electrode terminal and the second electrode terminal are the negative electrode and the positive electrode, respectively.

4. The apparatus of claim 1, wherein the insulation mask comprises a through hole perforated at a position corresponding to the first electrode terminal of the battery cell, and has a plate-type structure in which a remaining portion excluding the through hole covers the remaining part of a surface of the battery cell, from which the first electrode terminal protrudes.

5. The apparatus of claim 1, wherein the insulation mask has a structure in which at least both sides thereof are fixed by the mask fixing portions so that the through hole is disposed between the first electrode terminal of the battery cell and the first charging pin of the first die plate.

6. The apparatus of claim 1, wherein the mask fixing portions comprise a pair of clips.

7. The apparatus of claim 1, wherein the mask fixing portions comprise a pair of vacuum suctions.

8. The apparatus of claim 1, wherein the mask fixing portions are mounted on the first die plate in a structure capable of moving in both directions with the first charging pin as a center so that positions of the fixing portions may be adjusted based on a size of the insulation mask or battery cell.

9. The apparatus of claim 1,
 wherein the first die plate is configured to be disposed toward the first electrode terminal of the battery cell during the charging and discharging process, and
 the first charging pin and insulation mask of the first die plate are simultaneously disposed affixed to the first die plate toward the first electrode terminal of the battery cell.

10. The apparatus of claim 1, wherein a thickness of the insulation mask is in a range of 10% to 90% of a protruding height of the first electrode terminal of the battery cell.

11. The apparatus of claim 1, wherein, during the charging and discharging process, the insulation mask is configured to abut the surface of the battery cell from which the first electrode terminal protrudes when the first die plate is disposed, and the first electrode terminal of the battery cell protrudes through the through hole of the insulation mask and is connected to the first charging pin of the first die plate.

12. The apparatus of claim 1, wherein the insulation mask is made of a polymeric resin.

13. The apparatus of claim 1, wherein the battery cell charging and discharging apparatus further includes a second die plate on which a second charging pin configured to be electrically connected to the second electrode terminal of the battery cell by being contacted thereto is formed.

14. The apparatus of claim 13, wherein the second charging pin is electrically connected to a portion of the battery case opposite to the first electrode terminal by being contacted thereto.

15. The apparatus of claim 13, wherein the second die plate is configured to be disposed toward the second electrode terminal of the battery cell during the charging and discharging process of the battery cell.

* * * * *